United States Patent [19]
Kubo et al.

[11] Patent Number: 5,874,022
[45] Date of Patent: Feb. 23, 1999

[54] LIQUID CRYSTAL COMPOSITION AND LIQUID CRYSTAL DISPLAY DEVICE

[75] Inventors: Yasuhiro Kubo, Ichihara; Fusayuki Takeshita, Kimitsu; Tetsuya Matsushita, Sodegaura; Etsuo Nakagawa; Tomoyuki Kondo, both of Ichihara, all of Japan

[73] Assignee: Chisso Corporation, Osaka, Japan

[21] Appl. No.: 927,808

[22] Filed: Sep. 12, 1997

[30] Foreign Application Priority Data

Sep. 25, 1996 [JP] Japan .................. 8-272855

[51] Int. Cl.[6] .......... C09K 19/52; C09K 19/30; C09K 19/12; C09K 19/02
[52] U.S. Cl. ............ 252/299.01; 252/299.61; 252/299.63; 252/299.66; 252/299.67; 349/184; 349/186
[58] Field of Search ............ 252/299.01, 299.61, 252/299.63, 299.66, 299.67; 349/184, 186

[56] References Cited

U.S. PATENT DOCUMENTS

| | | | |
|---|---|---|---|
| 5,032,313 | 7/1991 | Goto et al. | 252/299.63 |
| 5,480,581 | 1/1996 | Plach et al. | 252/299.63 |

FOREIGN PATENT DOCUMENTS

| | | |
|---|---|---|
| 0533034 | 4/1997 | European Pat. Off. . |
| 19528085 | 2/1996 | Germany . |
| 5-500679 | 2/1993 | Japan . |
| 2253402 | 9/1992 | United Kingdom . |
| 9009420 | 8/1990 | WIPO . |
| 9641847 | 12/1996 | WIPO . |

*Primary Examiner*—Shean C. Wu
*Attorney, Agent, or Firm*—Browdy and Neimark

[57] ABSTRACT

The present invention provides a liquid crystal composition satisfying many characteristics required to liquid crystal compositions for AM-LCD, having a preferable Δn value in proportion to the cell thickness, and having very low threshold value suitable for driving at low voltage.

The liquid crystal composition of the present invention comprises as the first constituent at least one compound selected from the group consisting of compounds represented by particular formula (I) and as the second constituent at least one compound selected from the group consisting of compounds represented by particular formulas (II-1)–(II-7).

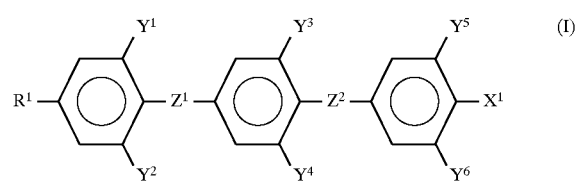

(I)

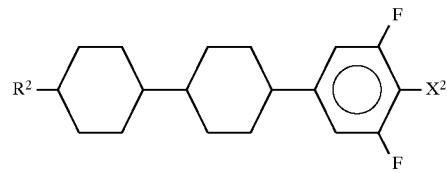

(II-1)

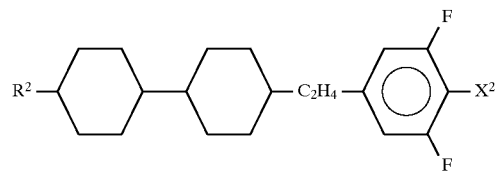

(II-2)

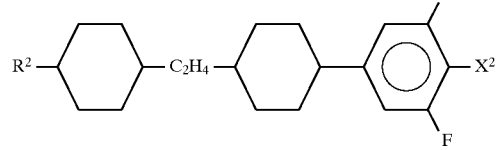

(II-3)

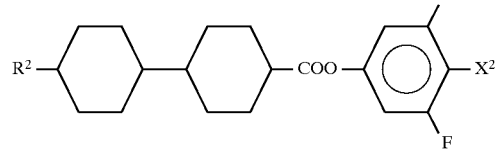

(II-4)

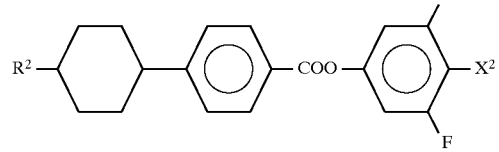

(II-5)

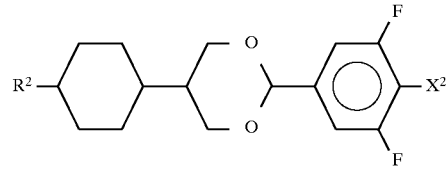

(II-6)

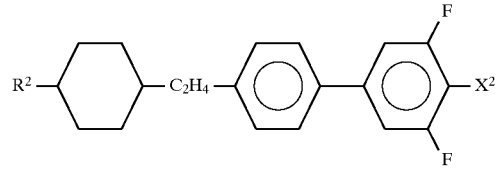

(II-7)

14 Claims, No Drawings

LIQUID CRYSTAL COMPOSITION AND LIQUID CRYSTAL DISPLAY DEVICE

BACKGROUND OF THE INVENTION

1. Field of the invention

The present invention relates to a liquid crystal composition for an active matrix LCD and a liquid crystal display device which is obtained by using the composition.

2. Description of the Prior Art

By reason that, compared with CRT (a display of a Braun tube type ), it is possible to provide a liquid crystal display device (LCD) having properties of lower consumption of electric power, a small size and light weight, many kinds of LCD, such as a twist nematic (TN) mode, a super twist nematic (STN) mode and a thin film transistor (TFT) mode, have been utilized. In particular, an active matrix LCD (AM-LCD) such as a thin film transistor (TFT) and the like is noticed as an important flat display which is a colored and highly precision apparatus.

The AM-LCD is required to have the following special properties:

1) a high voltage holding ratio (V.H.R.) for maintaining high contrast of LCD,
2) a wide operating range of temperatures showing a nematic liquid crystal phase,
3) proper optical anisotropy (Δn) in proportion to cell thickness, and
4) proper threshold voltage according to a driving circuit.

In the AM-LCD mode, a TN display mode having a structure twisting the alignment direction of liquid crystal molecules toward 90° between a pair of upper and lower electrode substrate plates is adopted. This TN display mode needs to prevent coloring by interference of liquid crystal cells when no voltage is applied, and it needs to establish a certain value (for example, Δn×d=~0.5 μm) of the product (Δn×d) of the optical anisotropy (Δn) and the cell thickness (d) μm. The Δn of liquid crystal compositions for TFT utilized under such limitations have Δn of about 0.07–0.15, particularly 0.08–0.13 in the 1st. Min. type. When liquid crystal materials having high Δn are used, the value of d can be lowered. If the value of d is lowered, since the response time (abbreviated as τ, hereinafter according to circumstances) is proportioned to the viscosity of liquid crystal materials (abbreviated as η, hereinafter according to circumstances) and to a square of the cell thickness d, the τ becomes remarkably lowered. The liquid crystal composition for a liquid crystal device having a proper high Δn is very useful.

In recent years, personal computers and the like which are characterized by a compact, light weight and of the portable note book type have been developed, so that the LCD becomes widely used. Characteristics of the LCD handy to carry are restricted by the driving power resource. Since the electric power consumption must be lowered for long-term use, liquid crystal compositions having low threshold voltage are required. Further, to obtain light and low-priced driving power resources, liquid crystals having low threshold voltage are required. The threshold voltage of liquid crystals for a 5 V driving equipment is practically about 2.0 V, and that of a 4 V driving equipment is about 1.6 V. Liquid crystal compositions having a threshold voltage of 1.5 V or less have recently become necessary.

In addition, following the small-sized LCD, development of equipment for use outdoors has studied. For use outdoors, a nematic phase over the range of outdoor ambient temperature is required. From this point of view, liquid crystal compositions of TFT for practical use have mainly a nematic-isotropic phase transition temperature (clearing point: $T_{NI}$) of 60° C. or more and a smectic-nematic phase transition temperature ($T_{SN}$) of −20° C. or less.

Following such backgrounds, a new compound and a liquid crystal composition using the compound are disclosed in Japanese Patent Publication H-5-500679-A. Though the composition has large Δn, it has too high a threshold voltage to use for low voltage driving. In the such publication, a composition for 2nd. Min. or PDLC is also disclosed. However, 1st. Min. is used in the field of AM-LCD. Accordingly, the composition disclosed in the publication H-5-500679-A has a disadvantage that the Δn is beyond the preferable range.

As described above, though the liquid crystal compositions are being studied by many objectives, new improvement is usually required.

SUMMARY OF THE INVENTION

The object of present invention is to provide a liquid crystal composition satisfying many characteristics required to the above liquid crystal composition for the AM-LCD, having preferable Δn in proportion to the cell thickness, and having very low threshold voltage which is able to drive a device at a low voltage.

The present inventors have earnestly studied compositions using many liquid crystal compounds, and have found that the expected object is attained by the following liquid crystal compounds for the AM-LCD.

The first aspect of the present inventions is a liquid crystal composition characterized in that it comprises as the first constituent at least one compound selected from the group consisting of compounds represented by general formula (I) and as the second constituent at least one compound selected from the group consisting of compounds represented by general formulas (II-1)–(II-7):

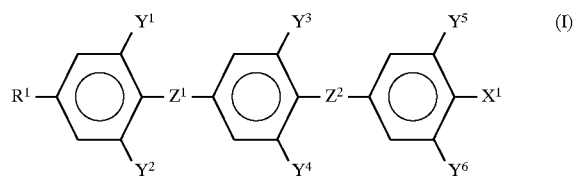

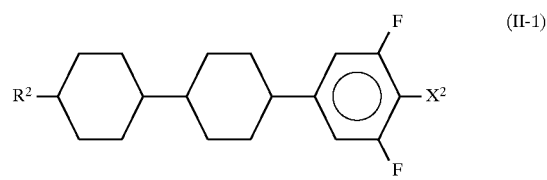

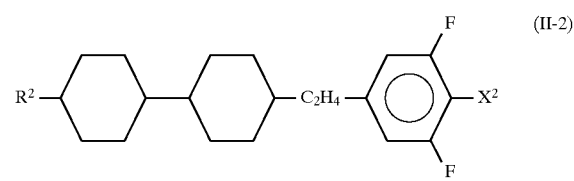

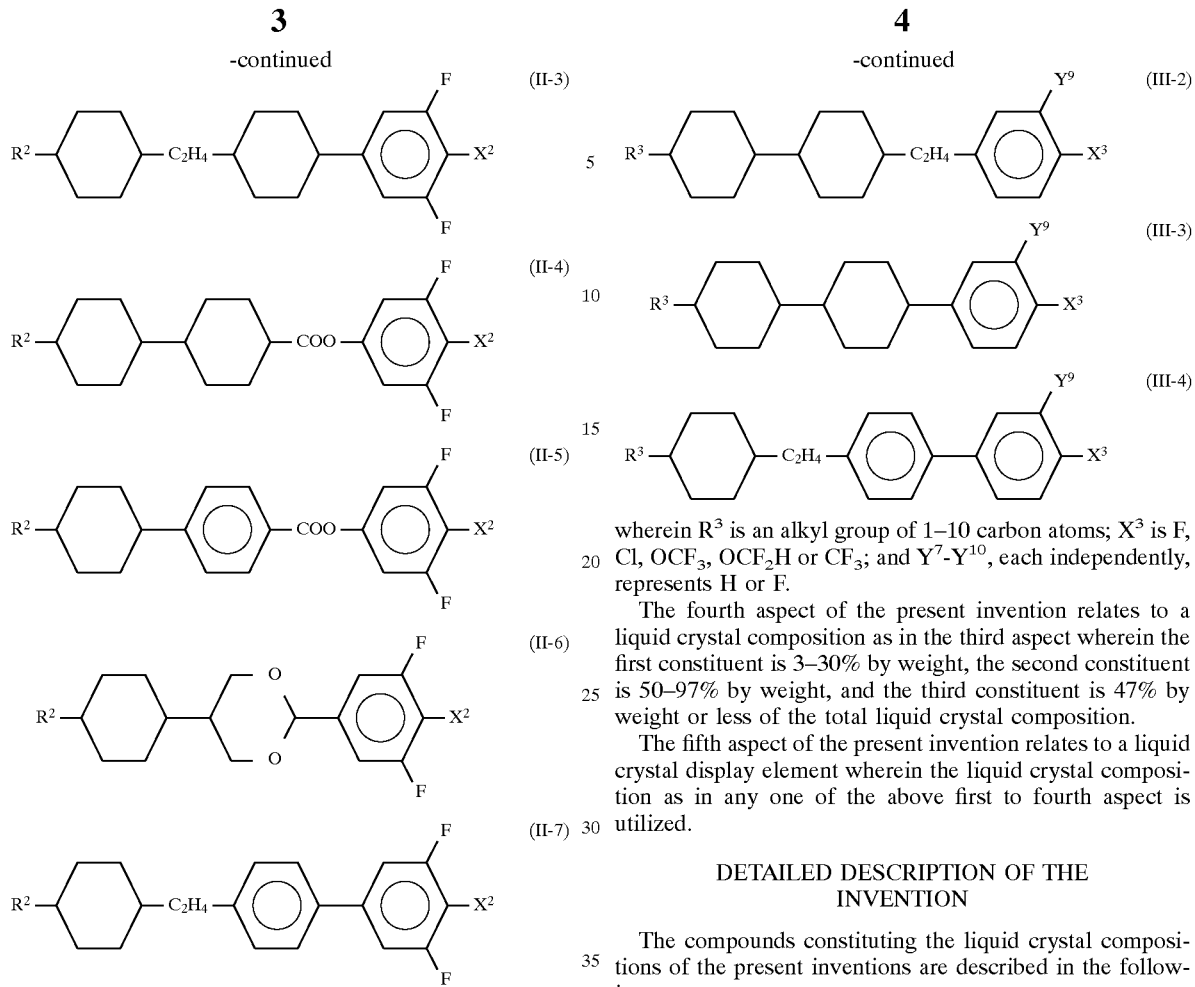

wherein $R^1$ and $R^2$, each independently, represents an alkyl group of 1–10 carbon atoms; $Z^1$ and $Z^2$, each independently, represents a single bond or —$C_2H_4$—; when one of $Z^1$ and $Z^2$ is —$C_2H_4$—, another is a single bond; $X^1$ and $X^2$, each independently, represents F, Cl, $OCF_3$, $OCF_2H$ or $CF_3$; and $Y^1$-$Y^6$, each independently, represents H or F.

The second aspect of the present invention relates to a liquid crystal composition as in the first aspect wherein the first constituent is 3–30% by weight and the second constituent is 50–97% by weight of the total liquid crystal composition.

The third aspect of the present invention relates to a liquid crystal composition as in the first or the second aspect, characterized in that it comprises as the first constituent at least one compound selected from the group consisting of compounds represented by general formula (I), as the second constituent at least one compound selected from the group consisting of compounds represented by general formulas (II-1)–(II-7), and as the third constituent at least one compound selected from the group consisting of compounds represented by general formulas (III-1)–(III-4):

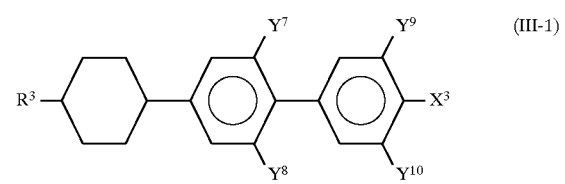

wherein $R^3$ is an alkyl group of 1–10 carbon atoms; $X^3$ is F, Cl, $OCF_3$, $OCF_2H$ or $CF_3$; and $Y^7$-$Y^{10}$, each independently, represents H or F.

The fourth aspect of the present invention relates to a liquid crystal composition as in the third aspect wherein the first constituent is 3–30% by weight, the second constituent is 50–97% by weight, and the third constituent is 47% by weight or less of the total liquid crystal composition.

The fifth aspect of the present invention relates to a liquid crystal display element wherein the liquid crystal composition as in any one of the above first to fourth aspect is utilized.

DETAILED DESCRIPTION OF THE INVENTION

The compounds constituting the liquid crystal compositions of the present inventions are described in the following.

Since the compounds represented by general formula (I) have a dielectric anisotropy ($\Delta\epsilon$) of about 10–25 and a clearing point ($T_{NI}$) of about 10°–60° C., these have good thermal stability and chemical stability. Particularly, these are useful to lower the threshold voltage of the liquid crystal composition for TFT which needs high reliability. However, since the optical anisotropy ($\Delta n$) is about 0.10–0.17, the $\Delta n$ of the composition becomes undesirably somewhat larger when the composition is prepared by using only these compounds.

Since the compounds represented by the general formulas (II-1)–(II-7) have a dielectric anisotropy ($\Delta\epsilon$) of about 6–15 and a clearing point ($T_{NI}$) of about 40°–100° C., these have good thermal stability and chemical stability. These compounds are useful to lower the threshold voltage of the liquid crystal composition. However, since the optical anisotropy ($\Delta n$) is about 0.06–0.10, the $\Delta n$ of the composition becomes undesirably somewhat small when the composition is prepared by using only these compounds.

It is possible, by combining several compounds represented by the general formula (I) with several compounds represented by the general formulas (II-1)–(II-7) to prepare the liquid crystal composition for AM-LCD which is the object of the present invention, which has a preferable value of $\Delta n$ in proportion to the cell thickness and very low threshold voltage to drive a device at a low voltage.

In the liquid crystal composition of the present invention, the content of the first constituent is preferably 3–30% by weight, more preferably 5–25% by weight. If the content of the first constituent is less than 3% by weight, sometimes the Δn of the liquid crystal composition becomes undesirably small. If the content of the first constituent is over 30% by weight, the clearing point of the liquid crystal composition is sometimes lowered and the Δn becomes undesirably large. The content of the second constituent is preferably 50–97% by weight, more preferably 60–90% by weight. If the content of the second constituent is less than 50% by weight, sometimes the Δn of the liquid crystal composition becomes undesirably large. If the content is over 97% by weight, sometimes the compatibility of the liquid crystal composition becomes inferior at a low temperature, and the Δn of the liquid crystal composition becomes undesirably small.

The compounds represented by the general formulas (III-1)–(III-4) can particularly elevate the clearing point. However, a liquid crystal composition containing a large amount of compound represented by the general formulas (III-1)–(III-4), sometimes the compatibility of the liquid crystal composition becomes bad at a low temperature. The content of the liquid crystal compositions (III-1)–(III-4) of the present invention are preferably 47% by weight or less.

The liquid crystal compositions of the present invention can be prepared by a conventional method. In general, a method that several constituents are dissolved at a high temperature is conducted. In addition, dichroic pigments such as mellocyanine group, styryl group, azo group, azomethine group, azoxy group, quinophthalone group, anthraquinone group and tetrazine group can be added to the liquid crystal compositions of the present invention to use as liquid crystal compositions for a guest-host (GH) mode. Otherwise, the liquid crystal compositions can be used for NCAP, which is prepared by a microcapsule of a nematic liquid crystal, or the compositions can be used for a polymer-dispersion type liquid crystal display (PDLCD) represented by a polymer network liquid crystal display (PNLCD) that three-dimensional network polymer is formed in a liquid crystal. Furthermore, it can be used as a liquid crystal composition for an electrically controlled birefringence (ECB) mode or a dynamic scattering (DS) mode.

DESCRIPTION OF THE PREFERRED EMBODIMENTS

The following examples illustrate the present invention more specifically, but these will not restrict the present invention. The compositions described in examples and comparative examples are expressed in percent by weight. The voltage holding ratio was determined by area ratio method described in Japanese Patent Laid-open Publication H-5-331464. In addition, the $T_{SN}$ point was determined by observation of a liquid crystal phase of samples after the samples were allowed to stand in freezers which were controlled at 0° C., −10° C., −20° C., −30° C., and −40° C., respectively.

Each compound in each example is represented by a symbols based on the abbreviation method declared in the following Table 1.

TABLE 1

$R-(A_1)-Z_1-\ldots-Z_n-(A_n)-X$

| 1) | Left end groups R— | Symbols |
|---|---|---|
| | $C_nH_{2n+1}-$ | n- |
| | $C_nH_{2n+1}O-$ | nO- |

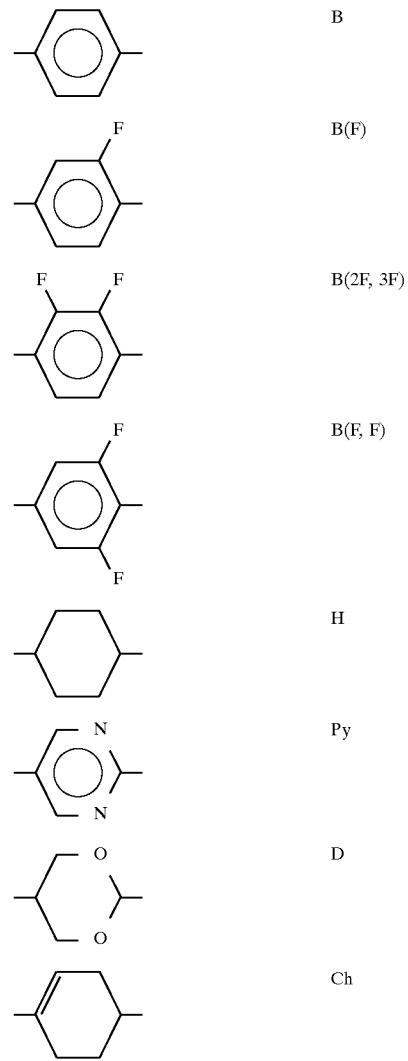

TABLE 1-continued $R-(A_1)-Z_1-\ldots-Z_n-(A_n)-X$

| | | |
|---|---|---|
| | $C_nH_{2n+1}OC_mH_{2m}-$ | nOm- |
| | $CH_2=CH-$ | V- |
| | $CH_2=CHC_nH_{2n}-$ | Vn- |
| | $C_nH_{2n+1}CH=CHC_mH_{2m}-$ | nVm- |
| | $C_nH_{2n+1}CH=CHC_mH_{2m}CH=CHC_kH_{2k}-$ | nVmVk- |

| 2) | Ring Structure $-(A_1)-$, $-(A_n)-$ | Symbols |
|---|---|---|
| | phenyl | B |
| | fluorophenyl | B(F) |
| | difluorophenyl | B(2F, 3F) |
| | difluorophenyl | B(F, F) |
| | cyclohexyl | H |
| | pyrimidine | Py |
| | dioxane | D |
| | cyclohexenyl | Ch |

| 3) | Bonding groups $-Z_1-$, $-Z_m-$ | Symbols |
|---|---|---|
| | $-C_2H_4-$ | 2 |
| | $-C_4H_8-$ | 4 |
| | $-COO-$ | E |
| | $-C\equiv C-$ | T |
| | $-CH=CH-$ | V |
| | $-CF_2O-$ | CF2O |
| | $-OCF_2-$ | OCF2 |

| 4) | Right end groups $-X$ | Symbols |
|---|---|---|
| | $-F$ | -F |
| | $-Cl$ | -CL |

TABLE 1-continued

R$-(A_1)-Z_1-\ldots-Z_n-(A_n)-X$

| | |
|---|---|
| $-CN$ | $-C$ |
| $-CF_3$ | $-CF3$ |
| $-OCF_3$ | $-OCF3$ |
| $-OCF_2H$ | $-OCF2H$ |
| $-C_nH_{2n+1}$ | -n |
| $-OC_nH_{2n+1}$ | $-On$ |
| $-COOCH_3$ | -EMe |
| $-C_nH_{2n}CH=CH_2$ | -nV |
| $-C_mH_{2m}CH=CHC_nH_{2n+1}$ | -mVn |
| $-C_mH_{2m}CH=CHC_nH_{2n}F$ | -mVnF |
| $-CH=CF_2$ | -VFF |
| $-C_nH_{2n}CH=CF_2$ | -nVFF |
| $-C\equiv C-CN$ | -TC |

5) Symbolized examples

Example 1
3-H2B(F,F)B(F)—F

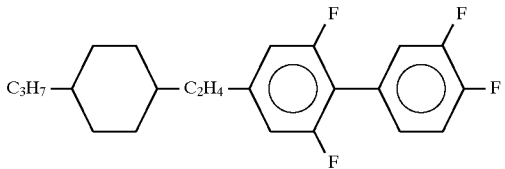

Example 2
3-HB(F)TB-2

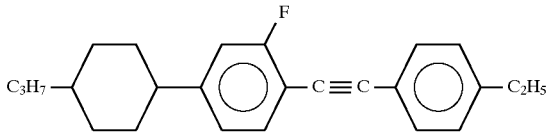

Example 3
1V2-BEB(F,F)—C

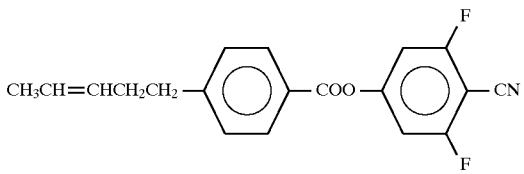

COMPARATIVE EXAMPLE 1

The following composition disclosed in example 11 of Japanese Patent Laid-open H-5-500679-A is prepared.

| | |
|---|---|
| 3-HB(F)B2B—F | 20.0% |
| 5-HB(F)B2B—F | 10.0% |
| 3-B(F)B2B—F | 30.0% |
| 5-B(F)B2B—F | 30.0% |
| 3-HB2B—F | 10.0% |

The transition points of the liquid crystal composition are $T_{NI}$=94° C. and $T_{SN}$<−40° C., the viscosity is $\eta_{20}$=35.3 (mPa×s) at 20° C., the optical anisotropy is Δn=0.177 at 25° C., and the threshold voltage is Vth=3.04 (V) at 20° C.

The liquid crystal composition is not suitable for low voltage driving because the value of Δn is too large and the threshold voltage is too high.

COMPARATIVE EXAMPLE 2

The following composition disclosed in example 12 of Japanese Patent Laid-open H-5-500679-A is prepared.

| | |
|---|---|
| 5-HB—F | 8.0% |
| 6-HB—F | 8.0% |
| 7-HB—F | 8.0% |
| 3-B(F)B2B—F | 6.0% |
| 5-B(F)B2B—F | 4.0% |
| 3-HB(F)B2B—F | 8.0% |
| 5-HB(F)B2B—F | 9.0% |
| 3-HBB(F)—F | 14.0% |
| 5-HBB(F)—F | 13.0% |
| 5-HBB(2F)-2 | 8.0% |
| 3-HB(F)BH-3 | 2.0% |
| 5-HB(F)BH-3 | 3.0% |
| 5-HB(F)BH-5 | 2.0% |
| 3-HH2B—OCF3 | 7.0% |

The transition points of the liquid crystal composition are $T_{NI}$=93° C. and $T_{SN}$<−40° C., the viscosity is $\eta_{20}$=20.1 (mPa×s) at 20° C., the optical anisotropy is Δn=0.128 at 20° C., and the threshold voltage is Vth=2.64 (V) at 20° C.

The liquid crystal composition is not suitable for low voltage driving because the value of Δn is suitable but the threshold voltage is very high.

COMPARATIVE EXAMPLE 3

The following composition disclosed in example 13 of Japanese Patent Laid-open H-5-500679-A is prepared.

| | |
|---|---|
| 5-HB—F | 8.0% |
| 6-HB—F | 8.0% |
| 7-HB—F | 8.0% |
| 3-B(F)B2B—F | 6.0% |
| 5-B(F)B2B—F | 4.0% |
| 3-HB(F)B2B—F | 8.0% |
| 5-HB(F)B2B—F | 9.0% |
| 3-HBB(F)—F | 14.0% |
| 5-HBB(F)—F | 13.0% |
| 5-HBB(2F)-2 | 8.0% |
| 3-HB(F)BH-3 | 2.0% |
| 5-HB(F)BH-3 | 3.0% |
| 5-HB(F)BH-5 | 2.0% |
| 3-HH2B—OCF3 | 7.0% |

The transition points of the liquid crystal composition are $T_{NI}$=91° C. and $T_{SN}$<−40° C., the viscosity is $\eta_{20}$=22.1 (mPa×s) at 20° C., the optical anisotropy is Δn=0.129 at 25° C., and the threshold voltage is Vth=2.58 (V) at 20° C.

The liquid crystal composition is not suitable for low voltage driving because the value of Δn is suitable but the threshold voltage is very high.

EXAMPLE 1

| | |
|---|---|
| 3-BB(F)B(F,F)—F | 2.0% |
| 3-B(F)BB(F,F)—F | 2.0% |
| 3-H2HB(F,F)—F | 6.0% |
| 4-H2HB(F,F)—F | 5.0% |
| 5-H2HB(F,F)—F | 5.0% |
| 3-HH2B(F,F)—F | 5.0% |
| 3-HBB(F,F)—F | 24.0% |
| 5-HBB(F,F)—F | 20.0% |
| 5-HB(F,F)B(F)—F | 3.0% |
| 3-HBEB(F,F)—F | 4.0% |
| 3-HHEB(F,F)—F | 15.0% |
| 4-HHEB(F,F)—F | 4.0% |
| 5-HHEB(F,F)—F | 5.0% |

The transition points of the liquid crystal composition are $T_{NI}$=71.9° C. and $T_{SN}$<−30° C., the optical anisotropy is Δn=0.105 at 25° C., the viscosity is $\eta_{20}$=34.3 (mPa×s) at 20°

C., and the threshold voltage is Vth=1.12 (V) at 20° C. In addition, V.H.R (25° C.)=99.1%.

The liquid crystal composition is suitable because the value of Δn is preferable and the threshold voltage is very low.

EXAMPLE 2

| | |
|---|---|
| 3-B(F)BB(F,F)—F | 2.0% |
| 3-B(F,F)B(F)B(F)—F | 2.0% |
| 3-BB(F,F)B(F,F)—Cl | 3.0% |
| 3-H2HB(F,F)—F | 7.0% |
| 5-H2HB(F,F)—F | 8.0% |
| 3-HHB(F,F)—F | 10.0% |
| 4-HBB(F,F)—F | 5.0% |
| 3-HH2B(F,F)—F | 9.0% |
| 5-HH2B(F,F)—F | 9.0% |
| 3-HBB(F,F)—F | 15.0% |
| 5-HBB(F,F)—F | 15.0% |
| 3-HBEB(F,F)—F | 2.0% |
| 3-HHEB(F,F)—F | 10.0% |
| 5-HHEB(F,F)—F | 3.0% |

The transition points of the liquid crystal composition are $T_{NI}$=77.4° C. and $T_{SN}$<-30° C., the optical anisotropy is Δn=0.101 at 25° C., the viscosity is $\eta_{20}$=33.1 (mPa×s) at 20° C., and the threshold voltage is Vth=1.06 (V) at 20° C. In addition, V.H.R (25° C.)=98.8%.

The liquid crystal composition is suitable because the value of Δn is preferable and the threshold voltage is very low.

EXAMPLE 3

| | |
|---|---|
| 3-B(F)BB(F,F)—F | 3.0% |
| 3-BB(F)B(F,F)—OCF3 | 3.0% |
| 7-HB(F,F)—F | 6.0% |
| 3-H2HB(F,F)—F | 9.0% |
| 3-HH2B(F,F)—F | 7.0% |
| 5-HH2B(F,F)—F | 5.0% |
| 3-HHB(F,F)—F | 7.0% |
| 3-HBB(F,F)—F | 19.0% |
| 5-HBB(F,F)—F | 18.0% |
| 2-HBEB(F,F)—F | 3.0% |
| 3-HBEB(F,F)—F | 5.0% |
| 3-HHEB(F,F)—F | 10.0% |
| 5-HHEB(F,F)—F | 5.0% |

The transition points of the liquid crystal composition are $T_{NI}$=61.3° C. and $T_{SN}$<-30° C., the optical anisotropy is Δn=0.101 at 25° C., the viscosity is $\eta_{20}$=31.1 (mPa×s) at 20° C., and the threshold voltage is Vth=0.98 (V) at 20° C. In addition, V.H.R (25° C.)=99.0%.

The liquid crystal composition is suitable because the value of Δn is preferable and the threshold voltage is very low.

EXAMPLE 4

| | |
|---|---|
| 3-BB(F,F)B(F,F)—Cl | 2.0% |
| 3-BB(F)B(F,F)—F | 2.0% |
| 3-B(F,F)B(F)B(F)—F | 2.0% |
| 3-B2B(F,F)B(F)—F | 2.0% |
| 3-BB(F,F)2B(F)—Cl | 2.0% |
| 7-HB(F,F)—F | 8.0% |
| 3-H2HB(F,F)—F | 12.0% |
| 5-H2HB(F,F)—F | 10.0% |
| 3-HHB(F,F)—F | 8.0% |

-continued

| | |
|---|---|
| 4-HHB(F,F)—F | 4.0% |
| 3-HH2B(F,F)—F | 8.0% |
| 5-HH2B(F,F)—F | 6.0% |
| 3-HH2B—OCF3 | 2.0% |
| 3-HBB(F,F)—F | 16.0% |
| 5-HBB(F,F)—F | 16.0% |

The transition points of the liquid crystal composition are $T_{NI}$=60.2° C. and $T_{SN}$<-30° C., the optical anisotropy is Δn=0.094 at 25° C., the viscosity is $\eta_{20}$=30.3 (mPa×s) at 20° C., and the threshold voltage is Vth=1.01 (V) at 20° C. In addition, V.H.R (25° C.)=99.3%.

The liquid crystal composition is suitable because the value of Δn is preferable and the threshold voltage is very low.

EXAMPLE 5

| | |
|---|---|
| 3-BB(F)B(F,F)—OCF3 | 7.0% |
| 3-BB(F,F)2B(F,F)—Cl | 7.0% |
| 3-B(F)BB(F,F)—F | 10.0% |
| 3-BB(F,F)B(F,F)—Cl | 8.0% |
| 3-H2HB(F,F)—F | 9.0% |
| 4-H2HB(F,F)—F | 8.0% |
| 3-H2HB—OCF3 | 2.0% |
| 3-HHB(F,F)—F | 10.0% |
| 4-HHB(F,F)—F | 5.0% |
| 3-HBB(F,F)—F | 27.0% |
| 3-HB(F,F)B(F)—F | 2.0% |
| 3-HHBB(FF)—F | 5.0% |

The transition points of the liquid crystal composition are $T_{NI}$=62.5° C. and $T_{SN}$<-30° C., the optical anisotropy is Δn=0.128 at 25° C., the viscosity is $\eta_{20}$=37.7 (mPa×s) at 20° C., and the threshold voltage is Vth=0.86 (V) at 20° C. In addition, V.H.R (25° C.)=99.4%.

The liquid crystal composition is suitable because the value of Δn is preferable and the threshold voltage is very low.

EXAMPLE 6

| | |
|---|---|
| 3-BB(F)B(F,F)—F | 4.0% |
| 3-B(F)BB(F,F)—F | 5.0% |
| 3-B2B(FF)B(F)—F | 3.0% |
| 3-HBB(FF)—F | 11.0% |
| 5-HBB(F,F)—F | 11.0% |
| 3-HHB(FF)—F | 7.0% |
| 3-HH2B(F,F)—F | 10.0% |
| 5-HH2B(F,F)—F | 7.0% |
| 3-H2HB(FF)—F | 9.0% |
| 4-H2HB(FF)—F | 9.0% |
| 5-H2HB(F,F)—F | 9.0% |
| 2-HBEB(F,F)—F | 3.0% |
| 3-HBEB(F,F)—F | 5.0% |
| 3-HHBB(F,F)—F | 7.0% |

The transition points of the liquid crystal composition are $T_{NI}$=77.3° C. and $T_{SN}$<-30° C., the optical anisotropy is Δn=0.108 at 25° C., the viscosity is $\eta_{20}$=35.9 (mPa×s) at 20° C., and the threshold voltage is Vth=1.06 (V) at 20° C. In addition, V.H.R (25° C.)=98.8%.

The liquid crystal composition is suitable because the value of Δn is preferable and the threshold voltage is very low.

EXAMPLE 7

| | |
|---|---|
| 3-B2B(F,F)B(F)—F | 4.0% |
| 3-B(F)2B(F)B(F)—F | 4.0% |
| 3-B(F,F)2B(F)B(F)—F | 3.0% |
| 3-H2BB(F,F)—F | 15.0% |
| 5-H2BB(F,F)—F | 5.0% |
| 3-H2HB(F,F)—F | 6.0% |
| 4-H2HB(F,F)—F | 6.0% |
| 5-H2HB(F,F)—F | 6.0% |
| 3-HH2B(F,F)—F | 13.0% |
| 5-HH2B(F,F)—F | 9.0% |
| 5-HBB(F,F)—F | 17.0% |
| 2-HHBB(F,F)—F | 6.0% |
| 3-HHBB(F,F)—F | 6.0% |

The transition points of the liquid crystal composition are $T_{NI}=77.0°$ C. and $T_{SN}<-30°$ C., the optical anisotropy is $\Delta n=0.107$ at 25° C., the viscosity is $\eta_{20}=33.5$ (mPa×s) at 20° C., and the threshold voltage is Vth=1.23 (V) at 20° C. In addition, V.H.R (25° C.)=99.0%.

The liquid crystal composition is suitable because the value of $\Delta n$ is preferable and the threshold voltage is very low.

EXAMPLE 8

| | |
|---|---|
| 3-BB(F)B(F,F)—OCF3 | 3.0% |
| 3-B(F,F)2B(F)B(F)—Cl | 9.0% |
| 3-BB(F,F)B(F,F)—Cl | 2.0% |
| 3-B(F,F)B(F)B(F)—F | 3.0% |
| 2-HHB(F)—F | 12.0% |
| 3-HHB(F)—F | 12.0% |
| 5-HHB(F)—F | 12.0% |
| 3-HHB—Cl | 4.0% |
| 3-H2HB(F,F)—F | 9.0% |
| 5-H2HB(F,F)—F | 9.0% |
| 3-HHB(F,F)—F | 5.0% |
| 3-HH2B(F,F)—F | 10.0% |
| 5-HH2B(F,F)—F | 10.0% |

The transition points of the liquid crystal composition are $T_{NI}=68.5°$ C. and $T_{SN}<-30°$ C., the optical anisotropy is $\Delta n=0.088$ at 25° C., the viscosity is $\eta_{20}=29.0$ (mPa×s) at 20° C., and the threshold voltage is Vth=1.15 (V) at 20° C. In addition, V.H.R (25° C.)=99.2%.

The liquid crystal composition is suitable because the value of $\Delta n$ is preferable and the threshold voltage is very low.

EXAMPLE 9

| | |
|---|---|
| 3-BB(F,F)B(F,F)—OCF2H | 2.0% |
| 3-BB(F,F)2B(F,F)—OCF2H | 2.0% |
| 3-BB(F)B(F,F)—F | 4.0% |
| 3-HBB(F,F)—F | 8.0% |
| 5-HBB(F,F)—F | 9.0% |
| 3-HHB(F,F)—F | 6.0% |
| 3-HH2B(F,F)—F | 8.0% |
| 5-HH2B(F,F)—F | 8.0% |
| 3-HH2B(F)—F | 2.0% |
| 3-H2HB(F,F)—F | 10.0% |
| 4-H2HB(F,F)—F | 9.0% |
| 5-H2HB(F,F)—F | 9.0% |
| 2-HHB(F)—F | 4.0% |
| 3-HHB(F)—F | 5.0% |
| 5-HHB(F)—F | 5.0% |
| 2-HBEB(F,F)—F | 3.0% |
| 3-HBEB(F,F)—F | 3.0% |
| 5-HBEB(F)—F | 3.0% |

The transition points of the liquid crystal composition are $T_{NI}=83.6°$ C. and $T_{SN}<-30°$ C., the optical anisotropy is $\Delta n=0.094$ at 25° C., the viscosity is $\eta_{20}=31.4$ (mPa×s) at 20° C., and the threshold voltage is Vth=1.01 (V) at 20° C. In addition, V.H.R (25° C.)=98.9%.

The liquid crystal composition is suitable because the value of $\Delta n$ is preferable and the threshold voltage is very low.

EXAMPLE 10

| | |
|---|---|
| 3-BB(F,F)B(F,F)—Cl | 4.0% |
| 3-B(F)BB(F,F)—F | 4.0% |
| 3-B(F,F)B(F)B(F)—F | 4.0% |
| 3-B(F,F)2B(F)B(F)—Cl | 4.0% |
| 3-H2HB(F,F)—F | 11.0% |
| 4-H2HB(F,F)—F | 9.0% |
| 5-H2HB(F,F)—F | 9.0% |
| 3-HHB(F,F)—F | 8.0% |
| 3-HH2B(F,F)—F | 12.0% |
| 5-HH2B(F,F)—F | 7.0% |
| 3-HBB(F,F)—F | 7.0% |
| 5-HBB(F,F)—F | 6.0% |
| 2-HH2B(F)—F | 5.0% |
| 3-HH2B(F)—F | 5.0% |
| 5-HH2B(F)—F | 5.0% |

The transition points of the liquid crystal composition are $T_{NI}=72.5°$ C. and $T_{SN}<-30°$ C., the optical anisotropy is $\Delta n=0.101$ at 25° C., the viscosity is $\eta_{20}=31.7$ (mPa×s) at 20° C., and the threshold voltage is Vth=1.17 (V) at 20° C. In addition, V.H.R (25° C.)=99.1%.

The liquid crystal composition is suitable because the value of $\Delta n$ is preferable and the threshold voltage is very low.

EXAMPLE 11

| | |
|---|---|
| 3-BB(F)B(F,F)—OCF3 | 5.0% |
| 3-BB(F,F)B(F,F)—OCF2H | 5.0% |
| 3-B2B(F,F)B(F)—F | 5.0% |
| 3-B(F,F)2B(F)B(F)—Cl | 4.0% |
| 3-H2HB(F,F)—F | 12.0% |
| 5-H2HB(F,F)—F | 10.0% |
| 3-HHB(F,F)—F | 10.0% |
| 3-HH2B(F,F)—F | 15.0% |
| 3-HBB(F,F)—F | 10.0% |
| 3-HHEB(F,F)—F | 11.0% |
| 5-HHEB(F,F)—F | 5.0% |
| 3-H2BB(F)—F | 4.0% |
| 5-H2BB(F)—F | 4.0% |

The transition points of the liquid crystal composition are $T_{NI}=72.0°$ C. and $T_{SN}<-30°$ C., the optical anisotropy is $\Delta n=0.101$ at 25° C., the viscosity is $\eta_{20}=30.7$ (mPa×s) at 20° C., and the threshold voltage is Vth=1.28 (V) at 20° C. In addition, V.H.R (25° C.)=98.8%.

The liquid crystal composition is suitable because the value of $\Delta n$ is preferable and the threshold voltage is very low.

EXAMPLE 12

| | |
|---|---|
| 3-BB(F)B(F,F)—F | 3.0% |
| 3-B(F)BB(F,F)—F | 3.0% |
| 3-B(F,F)B(F)B(F)—F | 3.0% |
| 3-B(F)2B(F)B(F)—F | 3.0% |
| 3-BB(F,F)2B(F,F)—Cl | 3.0% |
| 3-H2HB(F,F)—F | 10.0% |
| 4-H2HB(F,F)—F | 10.0% |
| 5-H2HB(F,F)—F | 10.0% |
| 3-HHB(F,F)—F | 10.0% |
| 4-HHB(F,F)—Cl | 5.0% |
| 3-HH2B(F,F)—F | 15.0% |
| 4-HH2B(F,F)—F | 5.0% |
| 5-HH2B(F,F)—F | 10.0% |
| 2-HHB(F)—F | 3.0% |
| 3-HHB(F)—F | 3.0% |
| 5-HHB(F)—F | 4.0% |

The transition points of the liquid crystal composition are $T_{NI}=74.6°$ C. and $T_{SN}<-30°$ C., the optical anisotropy is $\Delta n=0.093$ at 25° C., the viscosity is $\eta_{20}=32.6$ (mPa×s) at 20° C., and the threshold voltage is Vth=1.12 (V) at 20° C. In addition, V.H.R (25° C.)=99.1%.

The liquid crystal composition is suitable because the value of $\Delta n$ is preferable and the threshold voltage is very low.

EXAMPLE 13

| | |
|---|---|
| 3-BB(F,F)B(F,F)—Cl | 2.0% |
| 3-B(F,F)2B(F)B(F)—Cl | 2.0% |
| 3-BB(F,F)2B(F,F)—Cl | 2.0% |
| 3-B(F,F)B2B(F,F)—OCF2H | 2.0% |
| 3-H2HB(F,F)—F | 8.0% |
| 4-H2HB(F,F)—F | 8.0% |
| 5-H2HB(F,F)—F | 8.0% |
| 3-HH2B(F,F)—OCF3 | 7.0% |
| 3-HBB(F,F)—F | 35.0% |
| 5-HBB(F,F)—F | 26.0% |

The transition points of the liquid crystal composition are $T_{NI}=61.1°$ C. and $T_{SN}<-30°$ C., the optical anisotropy is $\Delta n=0.104$ at 25° C., the viscosity is $\eta_{20}=36.3$ (mPa×s) at 20° C., and the threshold voltage is Vth=1.32 (V) at 20° C. In addition, V.H.R (25° C.)=99.2%.

The liquid crystal composition is suitable because the value of $\Delta n$ is preferable and the threshold voltage is very low.

EXAMPLE 14

| | |
|---|---|
| 3-B(F,F)2B(F)B(F)—Cl | 3.0% |
| 3-BB(F)B(F,F)—F | 2.0% |
| 3-B(F)BB(F,F)—F | 2.0% |
| 3-H2HB(F,F)—F | 7.0% |
| 5-H2HB(F,F)—F | 7.0% |
| 3-H2BB(F,F)—F | 8.0% |
| 5-H2BB(F,F)—F | 8.0% |
| 4-H2BB(F,F)—CF3 | 5.0% |
| 3-HBB(F,F)—F | 28.0% |
| 5-HBB(F,F)—F | 28.0% |
| 1O1-HBBH-5 | 2.0% |

The transition points of the liquid crystal composition are $T_{NI}=64.1°$ C. and $T_{SN}<-30°$ C., the optical anisotropy is $\Delta n=0.116$ at 25° C., the viscosity is $\eta_{20}=35.7$ (mPa×s) at 20° C., and the threshold voltage is Vth=1.24 (V) at 20° C. In addition, V.H.R (25° C.)=99.0%.

The liquid crystal composition is suitable because the value of $\Delta n$ is preferable and the threshold voltage is very low.

EXAMPLE 15

| | |
|---|---|
| 3-BB(F)B(F,F)—F | 5.0% |
| 3-B(F)BB(F,F)—F | 5.0% |
| 3-B(F,F)2B(F)B(F)—F | 3.0% |
| 3-B(F,F)B(F)B(F)—F | 2.0% |
| 7-HB(F,F)—F | 5.0% |
| 3-H2HB(F,F)—F | 12.0% |
| 3-HHB(F,F)—F | 10.0% |
| 3-HBB(F,F)—F | 10.0% |
| 3-HHEB(F,F)—F | 8.0% |
| 4-HHEB(F,F)—F | 3.0% |
| 5-HHEB(F,F)—F | 3.0% |
| 3-HHEB—OCF3 | 2.0% |
| 2-HBEB(F,F)—F | 3.0% |
| 3-HBEB(F,F)—F | 5.0% |
| 5-HBEB(F,F)—F | 3.0% |
| 3-HDB(F,F)—F | 15.0% |
| 3-HHBB(F,F)—F | 6.0% |

The transition points of the liquid crystal composition are $T_{NI}=65.7°$ C. and $T_{SN}<-30°$ C., the optical anisotropy is $\Delta n=0.099$ at 25° C., the viscosity is $\eta_{20}=37.8$ (mPa×s) at 20° C., and the threshold voltage is Vth=0.86 (V) at 20° C. In addition, V.H.R (25° C.)=99.1%.

The liquid crystal composition is suitable because the value of $\Delta n$ is preferable and the threshold voltage is very low.

As shown in comparative examples and examples, according to the present invention, liquid crystal compositions satisfying many characteristics required to liquid crystal compositions for AM-LCD can be provided. The compositions have the preferable $\Delta n$ value in proportion to the cell thickness, meet to the conditions of 1st. Min., and have very low threshold value for suitable low voltage.

We claim:

1. A liquid crystal composition, characterized in that it comprises as the first constituent at least one compound selected from the group consisting of compounds represented by general formula (I) and as the second constituent at least one compound selected from the group consisting of compounds represented by general formulas (II-1)–(II-7):

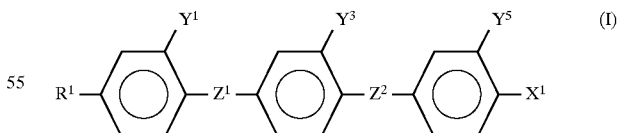

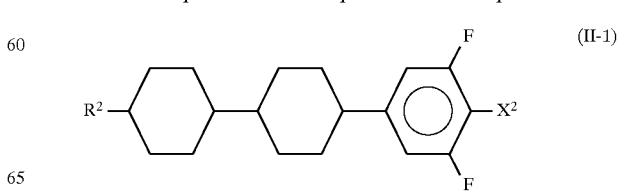

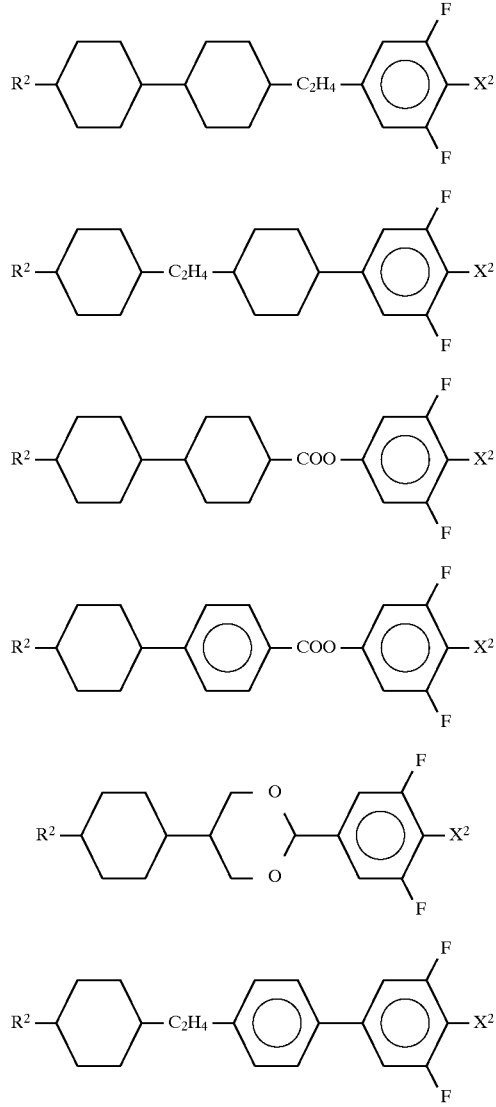

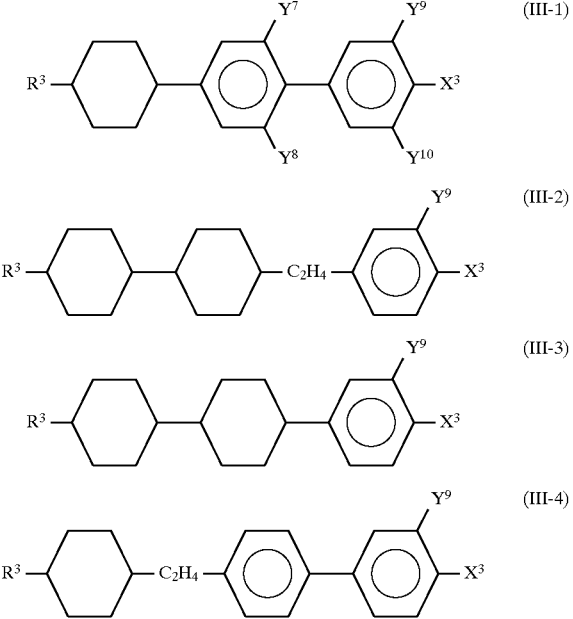

wherein $R^1$ and $R^2$, each independently, represents an alkyl group of 1–10 carbon atoms; $Z^1$ and $Z^2$, each independently, represents a single bond or —$C_2H_4$—; when one of $Z^1$ and $Z^2$ is —$C_2H_4$—, another is a single bond; $X^1$ and $X^2$, each independently, represents F, Cl, $OCF_3$, $OCF_2H$ or $CF_3$; and $Y^1$–$Y^6$, each independently, represents H or F.

2. A liquid crystal composition as in claim 1 wherein the first constituent is 3–30% by weight and the second constituent is 50–97% by weight of the total liquid crystal composition.

3. A liquid crystal composition as in claim 1, characterized in that it comprises as the first constituent at least one compound selected from the group consisting of compounds represented by general formula (I), as the second constituent at least one compound selected from the group consisting of compounds represented by general formulas (II-1)–(II-7), and as the third constituent at least one compound selected from the group consisting of compounds represented by general formulas (III-1)–(III-4):

wherein $R^3$ is an alkyl group of 1–10 carbon atoms; $X^3$ is F, Cl, $OCF_3$, $OCF_2H$ or $CF_3$; and $Y^7$–$Y^{10}$, each independently, represents H or F.

4. A liquid crystal composition as in claim 3 wherein the first constituent is 3–30% by weight, the second constituent is 50–97% by weight, and the third constituent is 47% by weight or less of the total liquid crystal composition.

5. A liquid crystal display device wherein it is obtained from the liquid crystal composition claim 1.

6. A liquid crystal composition as in claim 2, characterized in that it comprises as the first constituent at least one compound selected from the group consisting of compounds represented by general formula (I), as the second constituent at least one compound selected from the group consisting of compounds represented by general formulas (II-1)–(II-7), and as the third constituent at least one compound selected from the group consisting of compounds represented by general formulas (III-1)–(III-4):

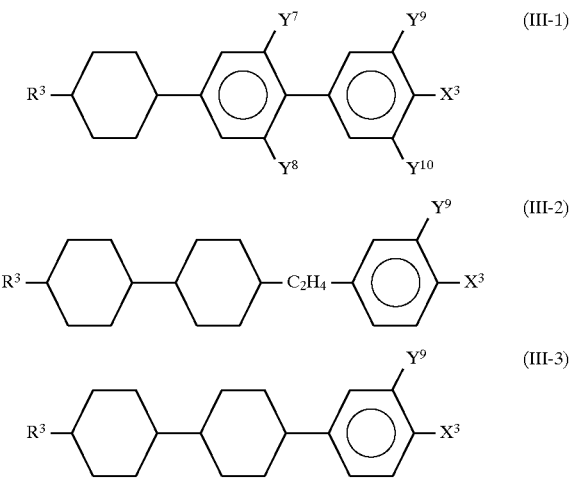

-continued

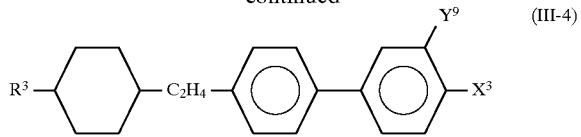

wherein $R^3$ is an alkyl group of 1–10 carbon atoms; $X^3$ is F, Cl, $OCF_3$, $OCF_2H$ or $CF_3$; and $Y^7$–$Y^{10}$, each independently, represents H or F.

7. In a liquid crystal display device comprising a liquid crystal composition, the improvement wherein said liquid crystal composition is the composition of claim 6.

8. In a liquid crystal display device comprising a liquid crystal composition, the improvement wherein said liquid crystal composition is the composition of claim 4.

9. In a liquid crystal display device comprising a liquid crystal composition, the improvement wherein said liquid crystal composition is the composition of claim 3.

10. In a liquid crystal display device comprising a liquid crystal composition, the improvement wherein said liquid crystal composition is the composition of claim 2.

11. A liquid crystal composition according to claim 2, consisting essentially of said first constituent and said second constituent.

12. A liquid crystal composition according to claim 4, consisting essentially of said first constituent, said second constituent and said third constituent.

13. A liquid crystal composition according to claim 1, wherein one of $Z^1$ and $Z^2$ is $C_2H_4$ and the other is a single bond.

14. A liquid crystal composition according to claim 1, having a Δn of less than 0.15, a threshold voltage of no greater than 1.5 V, a clearing point temperature $T_{NI}$ of at least 60° C., and a smectic-nematic phase transition temperature $T_{SN}$ of no greater than −20° C.

* * * * *